Patented Feb. 27, 1951

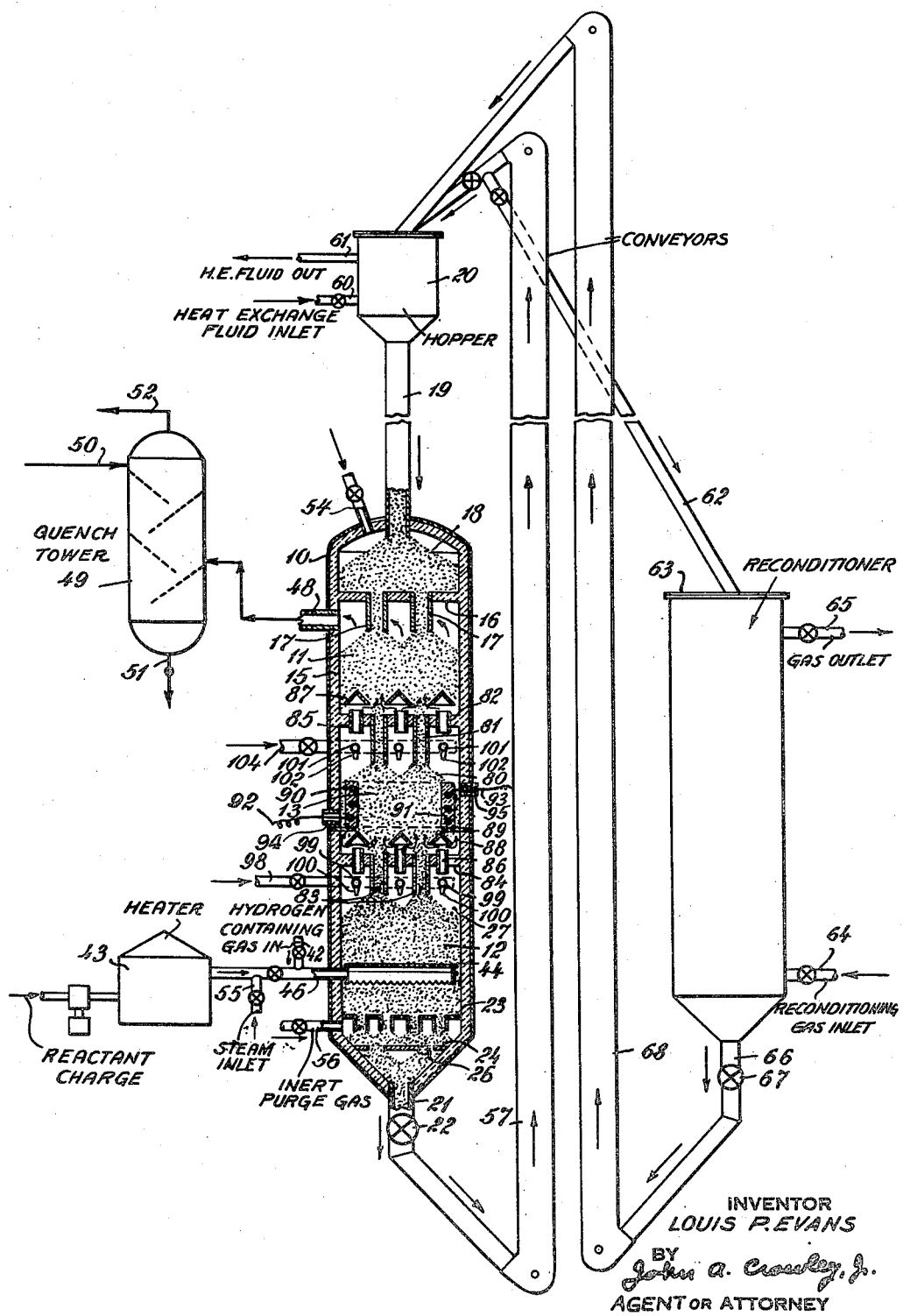

2,543,742

UNITED STATES PATENT OFFICE 2,543,742

METHOD FOR HIGH-TEMPERATURE CONVERSION OF GASEOUS HYDROCARBONS

Louis P. Evans, Woodbury, N. J., assignor to Socony-Vacuum Oil Company, Incorporated, a corporation of New York Application March 18, 1947, Serial No. 735,462

9 Claims. (Cl. 260—679)

1

This invention pertains to processes for conducting high temperature thermal conversions of gaseous material. This invention is particularly concerned with conversions wherein the reaction product is highly unstable under the elevated temperatures involved and requires quick cooling to prevent decomposition or polymerization thereof. Exemplary of such processes is the high temperature conversion of methane, propane and other light hydrocarbons to acetylene at temperatures of the order of 2000–2600° F. Another process is the pyrolytic dehydrogenation of unsaturated $C_2$ and $C_3$ hydrocarbons to di-olefins at temperatures of the order of 1400° F. to 1500° F. Another process is the pyrolytic cracking conversion of saturated light hydrocarbons such as ethane and butane to ethylene and hydrogen at temperatures of the order of 1300° F.–1750° F.

Several practical difficulties arise in attempting to conduct such processes as enumerated hereinabove. The temperatures required for the reactions are very high and the reaction products rapidly undergo decomposition and/or polymerization. In order to obtain the optimum yields of the desired products in such operations the residence time of the reactants at and near the very high reaction temperatures must be very accurately controlled. This in turn requires that the reactant feed be preheated to the reaction temperature in the shortest possible time, that the rate of heat input in the reaction zone be very high which in turn requires the largest possible excess of temperature in the source of heat above the minimum reaction temperature and relative to the volume of gas receiving the heat and that the reaction products must be cooled or quenched below the reaction temperature very rapidly.

A major object of this invention is the provision of an improved process for conducting gaseous conversions at elevated reaction temperatures which process permits accurate control of the reactant residence time at and near the desired conversion temperature.

Another object of this invention is the provision of a practical continuous process for conducting conversions of gaseous reactants in the presence of a moving particle-form solid material at temperatures which are substantially above those at which particle-form solids can be practically handled in conventional high temperature elevators.

Another object of this invention is the provision of a practical, continuous process for conversion of gaseous reactants at high temperatures in electrically heated reaction zones.

2

A specific object of this invention is the provision of a practical and economical continuous process for the production of acetylene from hydrocarbon gases at high temperatures.

Another object is the provision of an improved continuous process for the pyrolytic conversion of gaseous hydrocarbons to ethylene.

Still another object is the provision of a continuous pyrolytic process for the formation of butadiene from hydrocarbon gases.

These and other objects of this invention will become apparent from the following discussion thereof.

In general the process of this invention is one where in an inert particle-form contact material of high electrical conductivity and of high heat resistance is passed as a substantially compact column serially through a quench zone wherein it serves to quench gaseous reaction products, thereby becoming heated itself to a temperature near the desired reaction temperature, through a reaction zone wherein it is heated by the induction of electromagnetic currents therein and through a reactant preheating zone wherein it serves to preheat the gaseous reactant feed while itself being cooled to a temperature at which it may be practically handled in conventional conveyor equipment. At the same time the gaseous reactant is passed serially through the column of said contact material in said three zones countercurrently to the direction of flow of contact material and through the zones in inverse zone order to the contact material flow. The quenched gaseous products are withdrawn from the upper section of the quenching zone and passed to a suitable finishing system. The contact material may be recycled to the quenching zone from the preheating zone with or without intermediate reconditioning depending upon the operation involved. The reactant preheat temperature is limited to a level near to but below the reaction temperature by controlled cooling of the contact material passing from the reaction zone to the preheating zone. It should be understood that the words "gas" and "gaseous" are employed herein in a broad sense as meaning material in the gaseous phase under the particular conditions of temperature and pressure involved regardless of the normal phase of that material under ordinary atmospheric conditions.

The invention may be most readily understood by reference to the single drawing attached hereto which is an elevational view, partially in section, of a preferred arrangement of the system ance of the cyclic system. The gaseous products withdrawn from chamber 41 may be passed via conduit 48 to a suitable tower 49 where they may be further quenched by means of water or oil introduced at 50. Condensed products are withdrawn from tower 49 at the bottom outlet 51 and acetylene and other lower boiling products are withdrawn at the top outlet 52. This additional quenching in tower 49 may be omitted in many operations in which case the gaseous products withdrawn at 48 may be passed directly to a suitable fractionation or absorption system by which the desired products are obtained in pure form. Particle form contact material at a temperature of about 500° F., in the above example, enters the seal chamber 18 from hopper 20 via gravity feed leg 19. A seal gas such as steam or flue gas may be introduced into chamber 18 through conduit 57 at a sufficient rate to maintain a pressure in chamber 18 slightly above that in quench chamber 11. The contact material passes downwardly through tubes 17 into chamber 11 and then downwardly through chamber 11 as a substantially compact column and at a rate so controlled by valve 22 that upon reaching the bottom of chamber 11, the solid material has been heated by the gaseous reaction products to about the desired reaction temperature or slightly therebelow. For example, in the present example where the desired reaction temperature is of the order of about 2300° F., the contact material entering the reaction chamber 11 via conduits 81 may exist at a temperature of the order of 2000° F.–2300° F. The contact material moves downwardly through the reaction zone 13 as a substantially compact column, being heated by electrical induction as described hereinabove. Inasmuch as the heat supplied electrically into zone 13 is substantially the heat of reaction, the contact material passing from the reaction zone through conduits 83 to preheating zone 12 may exist substantially at the reaction temperature, having incurred little or no temperature drop during its passage through the reaction zone. In order to limit the maximum reactant preheat temperature in chamber 12 somewhat below the desired reaction temperature, the contact material passing from the reaction zone to the preheating zone should be cooled to about the desired maximum reactant feed preheat temperature. This may be accomplished by introducing a suitable quench liquid, for example, water, through manifold 98 into headers 99 from which it is sprayed from nozzles 100 onto the surface of the solid material column in chamber 12. This latter provision is of considerable importance because of the necessity for accurately controlling the amount of time at which the reactant gas exists at the desired reaction temperature. Too long a reactant residence time at the reaction temperature results in decomposition and polymerization of the desired products. In general it is desirable to limit the temperature to which the gaseous reactant feed is preheated in the preheating zone 12 to a level below but within about 300° F. of the minimum desired reaction temperature and preferably within about 100° F.–300° F. below the minimum desired reaction temperature. If desired, a separate contact material cooling stage may be interposed between the reaction chamber 13 and the preheating chamber 12. This additional chamber may conveniently be provided by interposing another partition with dependent tubes similar to partition 84 and tubes 83 within vessel 10 vertically between reaction and preheating chambers and extending the tubes 86 upwardly through the cooling chamber and the extra partition to permit by-pass of preheated gas through the cooling chamber. The cooling in such cooling chamber may be effected by introduction of a liquid quench or by provision of heat transfer tubes therein through which tubes a suitable cooling fluid is circulated. In still another modification cooling tubes may be positioned in the lower section of chamber 11. A suitable liquid or gas cooling fluid may be passed through these tubes to cool the solids to the desired reactant feed preheat temperature. This last modification has the advantage of providing higher quench rates in the lower section of quench chamber 11. The contact material, having been suitably cooled, moves downwardly through preheating chamber 12 as a substantially compact column and is further cooled by the gaseous reactant feed by the time it reaches outlet 21 to a temperature at which it may be conveniently handled in a conventional conveyor. In the present example the contact material passing from chamber 12 at the desired rate controlled by valve 22 on conduit 21 may have been cooled to about 510° F.

In order to limit the amount of carbon formed on the particle-form solid refractory material, steam may be introduced into the system either with the gaseous feed at 55 or as a purge gas at 56 to purge the outflowing solid material. In some cases, the carbon formation may be so limited as to make it unnecessary to pass the contact material through a carbon removal or reconditioning zone. In such cases the contact material may be conducted by conveyor 57 back to hopper 20. The conveyor 57 may be any of a number of types adapted for conveying solid particles without crushing the same, for example, a continuous bucket elevator.

In order to obtain proper thermal balances or for operational reasons it may be in some cases desirable to charge the contact material into quench zone 11 at a somewhat higher or lower temperature than that at which it passes from the preheating zone 12. In order to permit minor adjustments in the contact material temperature a suitable heating or cooling fluid may be passed through the bed of contact material maintained in hopper 20. Such fluid may be introduced to hopper 20 at 60 and withdrawn at 61. If desired, indirect heat transfer may be substituted for direct heat exchange in the hopper 20. When the use of steam in the reactant charge is not desirable and for operations where there is a gradual accumulation of carbonaceous material on the contact material it is desirable to pass all or a portion of the contact material from the preheating chamber 12 via conveyor 57 and conduit 62 to the reconditioner 63. In the modification shown, the reconditioner is in the form of a vertical burning chamber through which the contact material may flow as a substantially compact column. Combustion supporting gas introduced at 64 passes upwardly through vessel 63 in contact with the solid particles so as to burn off the carbonaceous deposits. Flue gas is withdrawn at 65. The contact material then passes from the vessel 63 through conduit 66 at a rate controlled by valve 67. The contact material is conducted by conveyor 68 to hopper 20 where its temperature may be adjusted to the desired level. Other types of reconditioners may be substituted for that shown in the figure. For example, where it is desirable to recover as by-product the carbon black deposited on the solid heat transfer material, it may be passed through a shaker or mill adapted to knock off the carbon black and then through a screening operation wherein it is separated from the carbon black and returned to hopper 20.

In operations requiring the use of a burning chamber to remove carbonaceous contaminants from the solid particles, the temperature of the contact material entering chamber 11 and leaving chamber 12 may be maintained sufficiently high for contaminant ignition when the contact material enters chamber 63. For example, in the above described process for manufacture of acetylene, the solid material may discharge from chamber 12 at about 700° F. In operations where the desired reaction product quench temperature requires lower solid inlet temperatures to the quench chamber, either of two procedures may be followed. In one procedure, for example, the contact material may enter quench chamber 11 at 400° F. but be withdrawn from chamber 12 at 700° F.–750° F. The additional heat required to balance the system may be provided by heater 45, i. e., the reactant charge may enter chamber 12 at about 750° F. In the other procedure, the solid material may be withdrawn from chamber 12 at 400° F., for example, and then be subjected to a preheating in conventional equipment before being charged to the burning chamber.

The particle-form contact material employed in the process of this invention should consist of a material having high electrical conductivity and being capable of standing the required reaction temperatures of the order of 2000° F.–3000° F. without fusion or decomposition and without entering into reaction with the gaseous reactants. Examples of such contact materials are tungsten, carbon and graphite particles. The solid particles may be in the form of granules, pellets, spheres, etc., having an average diameter within the range about $\frac{1}{32}$–1 inch, and preferably within the range about ¼ to ½ inch.

From the above discussion of this invention it will be apparent that the process of this invention provides an economical and highly flexible practical method for conducting high temperature gaseous reactions. Due to the extremely high heat transfer coefficients obtainable by passing gas directly through beds of particle-form heat carrying solids, the gaseous reactant feed is heated to a suitable temperature approaching the desired reaction temperature with great rapidity and accuracy and the gaseous reaction products are quenched to a temperature at which they are stable with equal rapidity and accuracy. Moreover, substantially constant and uniform temperature conditions are provided throughout the reaction zone and the endothermic heat of reaction, electrically induced into the heat carrying solid particles, is very rapidly transferred to the gaseous reactants. Inasmuch as substantially all of the electrical energy supplied is used solely to supply the heat of reaction, while the heat required to preheat the reactant feed is heat from within the system recovered from the reactant product quenching, a highly economical process from a thermal energy standpoint is provided. By providing very rapid reactant feed preheating as well as accurate limitation of the maximum preheat temperature below the desired reaction temperature by means of cooling the solid particles passing to the reactant preheating zone and by providing very rapid reaction product quenching, the reactant residence time at the reaction temperature may be controlled with considerable accuracy, thereby insuring the maximum yields of the desired principal reaction product. Flexibility in control of the overall thermal balance of the cyclic system is provided both by the provision of a reactant feed partial preheating furnace 45 and by the provision of liquid quench introduction into space 95 just above the reaction zone. Moreover, by the use of electrical energy to supply the heat of endothermic reactions in a separate reaction zone positioned at a central point along the path of flow of gas through the moving solid contact material, i. e., between the preheating and quenching chambers, it becomes possible to introduce contact material into chamber 11 at a relatively low temperature and to remove it from chamber 12 at about the same low temperature while still employing the contact material at very high temperatures at intermediate points in chambers 11 and 12. This feature permits the use of conventional conveyor equipment for transferring the solid material between chambers even though the reactions involved require temperatures far above those at which conveyor equipment can be practically operated. By the use of electrical heated reaction chamber 13 in this combined apparatus the above advantage has been attained without the dilution of reaction products by combustion gases and without the use of heat transfer tubes which permit only relatively low rates of heat transfer and which will not long withstand the temperatures involved.

It will be understood that the particular conditions of operating temperature, pressure and reactant residence time at the conversion temperature will vary depending upon the particular reaction and reactants involved. As an example, in the conversion of methane to acetylene a residence time of about 0.0001 to 1.0 second within the temperature range 2300° F.–3000° F. and pressures of substantially atmospheric and lower is desirable. When the methane is diluted with hydrogen or steam somewhat longer residence times up to 5–8 seconds are permissible. The amount of hydrogen and/or steam added with the feed may vary from about 3 to 40 mols per mol of hydrocarbon introduced. Somewhat lower temperatures may be employed for the conversion of higher molecular weight hydrocarbons to acetylene. For example, temperatures of the order of 1800° F. to 2300° F. are suitable for conversion of ethane to acetylene. In another example butadiene may be obtained by pyrolytic conversion of unsaturated $C_2$ and $C_3$ hydrocarbons at about 1450° F.–1600° F. and about atmospheric pressure at residence times of the order of $\frac{1}{10}$ to 2 seconds. On the other hand, naphtha cuts may be converted to butadiene containing products at temperatures of the order of 1300° F. to 1600° F. with a residence period of about .005–1 second. In the case of a butadiene containing product, the gaseous products should be quenched rapidly to a temperature below about 400° F. In another example olefins may be prepared from butane or propane by pyrolytic conversion at approximately atmospheric pressure and 1250° F.–1750° F., at about 1550° F. of the order .002 minutes residence time is suitable.

It will be understood that the examples of apparatus construction and operation and of applications of this invention given hereinabove are intended as illustrative and should not be construed as limiting the scope of this invention except as it may be limited by the following claims.

I claim:

1. The continuous method for pyrolytic conversion of gaseous hydrocarbon reactants at suitable elevated range of temperatures to form gaseous products unstable at said range of temperatures which comprises: passing a particle-form contact material of high electrical conductivity and high heat resistance as a substantially compact column of gravitating particles serially through a confined quench zone wherein it is heated while serving to quench hot gaseous reaction products, a reaction zone wherein it is contacted with gaseous reactants undergoing conversion and a preheating zone wherein it is cooled while serving to transfer heat picked up in said quench zone to the gaseous reactant feed; introducing gaseous reactant feed into the lower section of said preheating zone and passing it upwardly through said column therein to become preheated to a temperature below but within about 300° F. of the suitable conversion temperature; passing the preheated gaseous reactant upwardly through said column of contact material in said reaction zone to effect said conversion, heating said contact material in said reaction zone by the induction of electromagnetic currents therein to supply the endothermic heat for the hydrocarbon conversion; passing the gaseous products from said conversion zone upwardly through said column in said quench zone to be cooled to a suitable quench temperature; withdrawing quenched gaseous products from said quench zone, withdrawing cooled contact material from the lower section of said preheating zone at a controlled rate, passing at least a portion of said cooled contact material through a reconditioning zone to remove carbonaceous deposits therefrom, adjusting the temperature of said contact material to substantially said suitable quench temperature for said gaseous products and introducing said contact material so adjusted in temperature into the upper section of said quench zone.

2. The continuous method for pyrolytic conversion of gaseous hydrocarbon reactants at suitable elevated range of temperatures to form gaseous products unstable at said range of temperatures which comprises: passing a particle-form contact material of high electrical conductivity and high heat resistance as a substantially compact column of gravitating particles serially through a confined quench zone wherein it is heated while serving to quench hot gaseous reaction products, a reaction zone wherein it is contacted with gaseous reactants undergoing conversion and a preheating zone wherein it is cooled while serving to transfer heat picked up in said quench zone to the gaseous reactant feed; introducing gaseous reactant feed into the lower section of said preheating zone and passing it upwardly through said column therein to become preheated, introducing a suitable liquid cooling fluid into the upper section of said preheating zone at a controlled rate to control the preheat temperature of said gaseous reactants to a level within about 300° F. but below said suitable range of reaction temperatures, passing the preheated gaseous reactant upwardly through said column of contact material in said reaction zone to effect said conversion, heating said contact material in said reaction zone by the induction of electromagnetic currents therein to supply the endothermic heat for the hydrocarbon conversion; passing the gaseous products from said conversion zone upwardly through said column in said quench zone to be cooled to a suitable quench temperature; withdrawing quenched gaseous products from said quench zone, withdrawing cooled contact material from the lower section of said preheating zone at a controlled rate and returning it to said quench zone at approximately said suitable quench temperature.

3. The continuous method for pyrolytic conversion of gaseous hydrocarbon reactants at suitable elevated range of temperatures to form gaseous products unstable at said range of temperatures which comprises: passing a particle-form contact material of high electrical conductivity and high heat resistance as a substantially compact column of gravitating particles serially through a confined quench zone wherein it is heated while serving to quench hot gaseous reaction products, a reaction zone wherein it is contacted with gaseous reactants undergoing conversion and a preheating zone wherein it is cooled while serving to transfer heat picked up in said quench zone to the gaseous reactant feed; introducing gaseous reactant feed into the lower section of said preheating zone and passing it upwardly through said column therein to become preheated, introducing a suitable liquid cooling fluid into the upper section of said preheating zone at a controlled rate to control the preheat temperature of said gaseous reactants to a level within about 300° F. but below said suitable range of reaction temperatures, passing the preheated gaseous reactant upwardly through said column of contact material in said reaction zone to effect said conversion, heating said contact material in said reaction zone by the induction of electromagnetic currents therein to supply the endothermic heat for the hydrocarbon conversion; passing the gaseous products from said conversion zone upwardly through said column in said quench zone to be cooled to a suitable quench temperature; withdrawing quenched gaseous products from said quench zone, withdrawing cooled contact material from the lower section of said preheating zone at a controlled rate while controlling the discharge temperature of said contact material equal substantially to said suitable quench temperature for gaseous products by adjustment of the inlet temperature, by outside preheat, of said gaseous reactant feed to said preheating zone and directing the cooled contact material into the upper section of said quench zone.

4. The method for continuous conversion of gaseous hydrocarbons to acetylene containing products which comprises: passing a particle-form contact material of high electrical conductivity and high heat resistance as a substantially compact column of gravitating particles serially through a confined quench zone wherein it is heated while serving to quench hot gaseous reaction products, a reaction zone wherein it is contacted with gaseous reactants undergoing conversion and a preheating zone wherein it is cooled while serving to transfer heat picked up in said quench zone to the gaseous reactant feed; introducing gaseous reactant feed into the lower section of said preheating zone and passing it upwardly through said column therein to become preheated, introducing water into the upper section of said preheating zone at a controlled rate to control the temperature to which said gaseous reactants are preheated to a level within about 300° F., but below the suitable range of reaction temperatures, passing the preheated gaseous reactant upwardly through said column of contact material in said reaction zone to effect said conversion, heating said contact material in said reaction zone by the induction of electromagnetic currents therein to supply the endothermic heat for the hydrocarbon conversion; and to maintain a suitable reaction temperature in said zone above about 1800° F.; passing the gaseous products from said conversion zone upwardly through said column in said quench zone to be cooled to a temperature below about 700° F., withdrawing quenched gaseous products from said quench zone, withdrawing cooled contact material from the lower section of said preheating zone at a controlled rate and returning it to said quench zone at a suitable temperature below about 700° F.

5. The continuous method for pyrolytic conversion of gaseous hydrocarbon reactants at suitable elevated range of temperatures to form gaseous products unstable at said range of temperatures which comprises: passing a particle-form contact material of high electrical conductivity and high heat resistance as a substantially compact column of gravitating particles serially through a confined quench zone wherein it is heated while serving to quench hot gaseous reaction products, a reaction zone wherein it is contacted with gaseous reactants undergoing coversion and a preheating zone wherein it is cooled while serving to transfer heat picked up in said quench zone to the gaseous reactant feed; introducing gaseous reactant feed into the lower section of said preheating zone and passing it upwardly through said column therein to become preheated to a temperature below and within about 300° F. of the suitable conversion temperature; passing the preheated gaseous reactant upwardly through said column of contact material in said reaction zone to effect said conversion, heating said contact material in said reaction zone by the induction of electromagnetic currents therein to supply the endothermic heat for the hydrocarbon conversion; passing the gaseous products from said conversion zone upwardly through said column in said quench zone to be cooled to a suitable quench temperature; withdrawing quenched gaseous products from said quench zone and cooling the contact material passing from said reaction zone to said preheating zone to a temperature within the range 100° F. to 300° F. below its minimum temperature in said reaction zone.

6. The method for making acetylene from gaseous hydrocarbon reactants at suitable reaction temperatures within the range about 1800° F.–3000° F. which comprises: passing the gaseous hydrocarbon reactant serially through a preheating zone wherein it is rapidly heated to a temperature approaching but below said suitable conversion temperature, through a conversion zone wherein it is thermally converted to acetylene containing products at said suitable conversion temperature and through a quenching zone wherein the acetylene containing gaseous products are quickly cooled to a temperature below about 700° F.: utilizing the heat recovered from the quenching of said gaseous conversion products for preheating the gaseous hydrocarbon feed reactants by introducing a particle-form refractory contact material of high electrical conductivity into said quench zone at a temperature below about 700° F., passing said contact material as a substantially compact column through said quench zone countercurrently to said gaseous conversion products so as to rapidly quench said gaseous products while being heated thereby, passing the heated contact material from said quench zone as a substantially compact column through said conversion zone countercurrently to the gaseous reactant flow, inducing electromagnetic currents into said contact material as it moves through said conversion zone to supply thereto the endothermic heat required for the conversion of said gaseous reactants, passing the contact material from said conversion zone through said preheating zone as a substantially compact column countercurrently to the flow of said gaseous reactant feed to preheat said gaseous feed while being cooled thereby, withdrawing the cooled contact material from said preheating zone; and cooling the contact material delivered from said conversion zone to said preheating zone to a temperature below but within about 300° F. of said suitable conversion temperature so as to control the temperature to which the gaseous reactant feed is preheated.

7. The method for making acetylene from gaseous hydrocarbon reactants at suitable reaction temperatures within the range about 1800° F.–3000° F. which comprises: passing the gaseous hydrocarbon reactant serially through a preheating zone wherein it is rapidly heated to a temperature approaching but below said suitable conversion temperature, through a conversion zone wherein it is thermally converted to acetylene containing products at said suitable conversion temperature and through a quenching zone wherein the acetylene containing gaseous products are quickly cooled to a temperature below about 700° F.; utilizing the heat recovered from the quenching of said gaseous conversion products for preheating the gaseous hydrocarbon feed reactants by introducing a particle-form refractory contact material of high electrical conductivity into said quench zone at a temperature below about 700° F., passing said contact material as a substantially compact column through said quench zone countercurrently to said gaseous conversion products so as to rapidly quench said gaseous products while being heated thereby, passing the heated contact material from said quench zone as a substantially compact column through said conversion zone countercurrently to the gaseous reactant flow, inducing electromagnetic currents into said contact material as it moves through said conversion zone to supply thereto the endothermic heat required for the conversion of said gaseous reactants, passing the contact material from said conversion zone through said preheating zone as a substantially compact column countercurrently to the flow of said gaseous reactant feed to preheat said gaseous feed while being cooled thereby, withdrawing the cooled contact material from said preheating zone; and cooling the contact material delivered from said conversion zone to said preheating zone to a temperature below but within about 300° F. of said suitable conversion temperature so as to control the temperature to which the gaseous reactant feed is preheated, and introducing steam into said preheating zone at a controlled rate to mix with said reactants.

8. The method for making ethylene from saturated gaseous hydrocarbons having more than one carbon atom per molecule at suitable reaction temperatures within the range about 1300° F.–1750° F. which comprises: passing the gaseous hydrocarbon reactant serially through a preheating zone wherein it is rapidly heated to a temperature approaching but below said suitable conversion temperature, through a conversion zone wherein it is thermally converted to ethylene containing products at said suitable conversion temperature and through a quenching zone wherein the ethylene containing gaseous products are quickly cooled to a temperature below about 700° F., utilizing the heat recovered from the quenching of said gaseous conversion products for preheating the gaseous hydrocarbon feed reactants by introducing a particle-form refractory contact material of high electrical conductivity into said quench zone at a temperature below about 700° F., passing said contact material as a substantially compact column through said quench zone countercurrently to said gaseous conversion products so as to rapidly quench said gaseous products while being heated thereby, passing the heated contact material from said quench zone as a substantially compact column through said conversion zone countercurrently to the gaseous reactant flow, inducing electromagnetic currents into said contact material as it moves through said conversion zone to supply thereto the endothermic heat required for the conversion of said gaseous reactants, passing the contact material from said conversion zone through said preheating zone as a substantially compact column countercurrently to the flow of said gaseous reactant feed to preheat said gaseous feed while being cooled thereby, withdrawing the cooled contact material from said preheating zone; and cooling the contact material delivered from said conversion zone to said preheating zone to a temperature below but within about 300° F. of said suitable conversion temperature, so as to control the temperature to which the gaseous reactant feed is preheated.

9. The method for making butadiene from unsaturated gaseous hydrocarbons having more than one carbon atom per molecule at suitable reaction temperatures within the range about 1300–1600° F. which comprises: passing the gaseous hydrocarbon reactant serially through a preheating zone wherein it is rapidly heated to a temperature approaching but below said suitable conversion temperature, through a conversion zone wherein it is thermally converted to butadiene containing products at said suitable conversion temperature and through a quenching zone wherein the butadiene containing gaseous products are quickly cooled to a temperature below about 400° F.; utilizing the heat recovered from the quenching of said gaseous conversion products for preheating the gaseous hydrocarbon feed reactants by introducing a particle-form refractory contact material of high electrical conductivity into said quench zone at a temperature below about 400° F., passing said contact material as a substantially compact column through said quench zone countercurrently to said gaseous conversion products so as to rapidly quench said gaseous products while being heated thereby, passing the heated contact material from said quench zone as a substantially compact column through said conversion zone countercurrently to the gaseous reactant flow, inducing electromagnetic current into said contact material as it moves through said conversion zone to supply thereto the endothermic heat required for the conversion of said gaseous reactants, passing the contact material from said conversion zone through said preheating zone as a substantially compact column countercurrently to the flow of said gaseous reactant feed to preheat said gaseous feed while being cooled thereby, withdrawing the cooled reactant material from said preheating zone; and cooling the contact material delivered from said conversion zone to said preheating zone to a temperature below but within about 300° F. of said suitable conversion temperature, so as to control the temperature to which the gaseous reactant feed is preheated.

LOUIS P. EVANS.

REFERENCES CITED

The following references are of record in the file of this patent:

UNITED STATES PATENTS

| Number | Name | Date |
|---|---|---|
| 2,376,191 | Rotheli et al. | May 15, 1945 |
| 2,387,378 | Wolk | Oct. 23, 1945 |
| 2,389,636 | Ramseyer | Nov. 27, 1945 |
| 2,405,395 | Bahlke et al. | Aug. 6, 1946 |
| 2,406,640 | Siecke | Aug. 27, 1946 |
| 2,422,501 | Rotheli | June 17, 1947 |
| 2,432,520 | Ferro, Jr. | Dec. 16, 1947 |
| 2,477,502 | Utterback et al. | July 26, 1949 |